April 29, 1958 R. T. GARDNER 2,832,256

SYNCHROTESTER CASE

Filed Dec. 3, 1953

INVENTOR.

Ralph T. Gardner

BY Homer G. Sweet

Attorney.

2,832,256
Patented Apr. 29, 1958

2,832,256

SYNCHROTESTER CASE

Ralph T. Gardner, Denver, Colo.

Application December 3, 1953, Serial No. 396,043

7 Claims. (Cl. 88—14)

In the timing and correlation of certain desirably synchronous operations such, for example, as the firing of a flash bulb and the full opening of a camera shutter, testing apparatus is desirable and frequently utilized. Such testing apparatus is known and available in a variety of particular embodiments appropriately grouped under the designation of synchrotesters, and such apparatus is commonly of electric or electronic type characterized by a chassis carrying the significant circuits and elements in a unit assembly and a case adapted to house the chassis and to provide for convenient removable and replaceable association of elements to be tested in suitable cooperating relation with elements of the chassis. Synchrotesters commonly include a stroboscopic light as an element of the chassis in an arrangement suited to permit check of the elements to be tested or synchronized against the flashes of such light, hence for practical purposes it is material that the synchrotester case be of such construction and organization as to adjustably support the elements to be tested and regulated in operative correlation with the output from the stroboscopic light and in positions convenient of observation.

Fully meeting the practical requirements of synchrotester use in association with and for the correlation of various facilities and appliances, the present invention provides a novel and improved case adapted for operative association with conventional synchrotester chassis to house and protect the chassis and to adjustably support the elements to be tested in positions of convenient observation and appropriate correlation with the light output from the chassis.

It is an object of the invention to provide a synchrotester case adapted for fixed, housing association with a synchrotester chassis which is characterized by adjustable means for the support of an element to be tested in opposition to light signals from the chassis.

A further object of the invention is to provide a case of the character described that is convenient of use in association with a conventional chassis to facilitate the testing and correlation of a variety of facilities and appliances.

A further object of the invention is to provide a case of the character described that is convenient of transportation and expediently adaptable to use in a variety of environments and particular locations.

A further object of the invention is to provide a case of the character described that is readily manipulable in use to suit the convenience and preference of the user.

A further object of the invention is to provide a case of the character described that is simple and inexpensive of production, rugged and durable in use, convenient of operative adjustment, efficient in attainment of the ends for which designed, and compactly adapted for handling and transportation in full protecting relation with the associated chassis when adjusted to non-use position of its elements.

With the foregoing and other objects in view, my invention consists in the construction, arrangement, and operative combination of elements as hereinafter set forth, pointed out in my claims, and illustrated by the accompanying drawing, in which:

Figure 1:
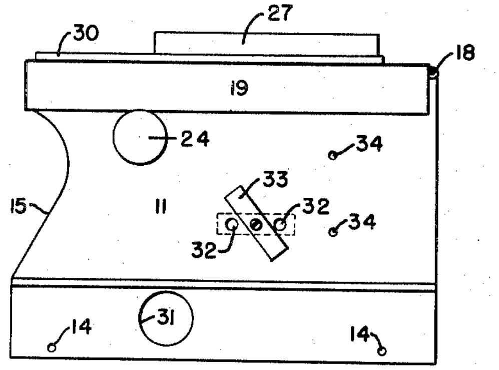
Figure 1 is a side elevation of a typical embodiment of the improved synchrotester case ready for association with a conventional chassis and with its movable elements closed to non-use position.
Figure 2:
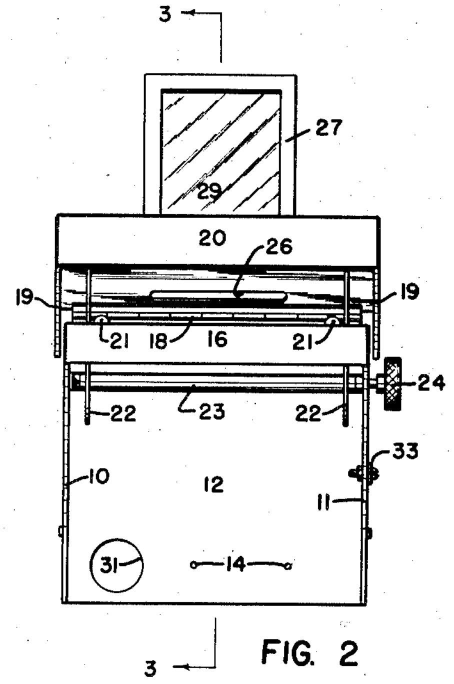
Figure 2 is a front end elevation of the case shown in Figure 1 with movable elements of the case extended in one position of use.
Figure 3:
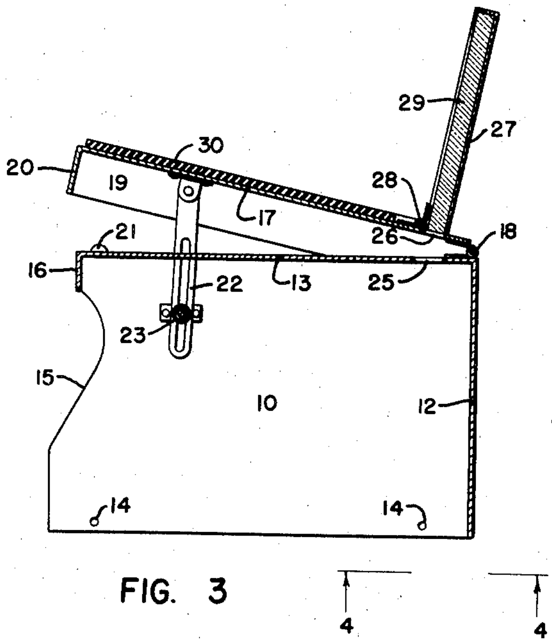
Figure 3 is a section longitudinally of the case taken substantially on the indicated line 3—3 of Figure 2.
Figure 4:
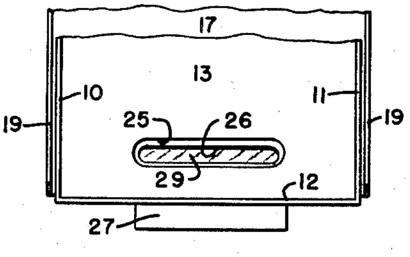
Figure 4 is a fragmentary, detail plan of the improved case as viewed substantially from the indicated zone 4—4 of Figure 3.

Synchrotester chassis are conventionally assembled on and with their elements upstanding in fixed relation from a rectangular base furnished with a control panel at and transversely of one end of the base, and the synchrotester case best accomplishes its purposes when it is arranged to engage with three sides of the chassis base in housing relation with the chassis elements and to expose the control panel of the chassis in position of convenient access.

Adapted for housing cooperation with a conventional synchrotester chassis in the manner just above set forth, the improved case is constituted from like side wall members 10 and 11 disposed in spaced parallel relation, an end wall 12 fixedly spanning perpendicularly between and marginally closing against corresponding ends of the walls 10 and 11, and a top member 13 perpendicularly bridging between the side walls 10 and 11 and closing at one end against the upper margin of the end wall 12, thus to provide a box-like unit having an open bottom and one open end. The elements 10, 11, 12 and 13 are formed from any suitable, substantially rigid, sheet material in any appropriate or desired manner to provide a length at the lower margins of the elements 10 and 11 equivalent to the length of the chassis base wherewith the case is to be associated, to provide an open width between the lower margins of the elements 10 and 11 equivalent to the width of the chassis base, and to provide a height in the elements 10 and 11 adequate to position the top member 13 in clearing relation with and above the elements carried by the chassis when lower margins of the walls 10, 11 and 12 are substantially in the plane of the bottom of the chassis base. Assembled and proportioned as shown and described, the housing constituted from the elements 10, 11, 12 and 13 is adapted to telescope over, about, and to engage with the two long sides and one end of a chassis base whereto the said housing may be secured by means of fasteners, such as screws, engaged through holes 14 formed for their reception through and adjacent the lower margins of the walls 10, 11 and 12, and with the chassis base; whereby to affix the housing to and in protecting relation with the chassis save for the one open end of the housing.

At the housing open end, free margins of the walls 10 and 11 are cut, as at 15, to register with ends of the control panel characterizing the chassis, and a flange 16 is formed on and depends perpendicularly from the otherwise free end of the top member 13 to span laterally of the housing between upper corners of the side walls 10 and 11 and to close at its lower margin against the upper edge of the chassis control panel, thereby completing the protective housing of the chassis and its elements while exposing the chassis control panel at one end of the housing for convenient access.

Conditioning the housing just described for its intended use, a platform 17, of flat, substantially rigid, sheet material, is provided in a size to overlie the top member 13 and is hinged at one end, as at 18, to the upper end of the end wall 12, or to the junction of said end wall with the top member 13, for adjustment through a vertical arc toward and away from said top member. Integral side flanges 19 and an integral end flange 20 depend perpendicularly from the free side and end margins of the platform 17 in position to engage exteriorly about and over upper zones of the side walls 10 and 11 and the flange 16 when said platform is lowered toward and into parallel relation with the top member 13; stop buttons 21 of cushioning material being secured to and adjacent the corners of the top member 13 remote from the hinge 18 in position to limit and determine travel of the platform 17 toward said top member.

In practical use of the improvement, the platform 17 is adapted to be adjusted about the axis of its hinge 18 to various positions of inclination relative to the top member 13 and to be secured in any such adjusted position within a substantial range of actuation, convenient means for securing the platform in a selected position of adjustment being represented as including slotted links 22 hingedly depending from the under surface of the platform inwardly adjacent the platform side flanges 19 and through slots in the top member 13 to slidably embrace a tubular clamp assembly 23, of conventional type, bridging laterally of the housing between the side walls 10 and 11 below the top member 13 and characterized by a manipulating knob 24 adjacent and exteriorly of the wall 11. As is well understood, the conventional clamp assembly 23 reacts when the knob 24 is turned in one direction to clampably engage and hold the links 22 in any given position of adjustment relative to the clamp assembly, while turning of the knob 24 in the opposite direction releases said links for shift relative to the assembly 23.

Inwardly adjacent the housing end wall 12, a slot 25 intersects the top member 13 tranversely of said member to function as a window through which light emanations from the stroboscopic lamp carried by the chassis may be manifest exteriorly of the housing, and a complementary slot 26 is formed in and transversely of the platform 17 in substantial registration with the slot 25 and in position to continue the path for light emanations from the housing through the platform. Disposed to register at one end with and to close over the slot 26 when in perpendicular relation with the platform 17, a frame 27 open at that end adjacent the slot 26 is hinged to said platform, as at 28, for manipulation about an axis transversely of the platform between overlying relation with the platform face and projection upwardly and perpendicularly therefrom, and a screen 29 of light-transmitting and light-diffusing material, such as Lucite, or the like, is mounted in the frame 27 to oppose an end of the screen to the slot 26 through the open end of the frame. Thus, with the frame 27 carrying the screen 29 swung to perpendicular relation with the platform 17 to register the end of the screen exposed through the hinged open end of the frame 27 with the slot 26, light emanations from the stroboscopic lamp carried by the chassis pass through the slot 25 and impinge upon the lower end of the screen and are immediately made manifest by the latter as a lighted area of substantially uniform intensity coextensive with the face of the screen directed toward the adjustable end of the platform. Obviously, various light-transmitting materials may be utilized for the screen 29 and it is well within the contemplation of the invention that said screen may be backed by reflecting material applied to either the frame 27 or the rear face of the screen and that one or both of the screen faces may be worked or treated for enhanced uniform diffusion of light imposed upon and through the screen. By virtue of its hinge 28, the frame 27 carrying the screen 29 may be folded downwardly against the upper face of the platform 17, as shown in Figure 1, to condition the assembly for storage, handling, and transportation with a minimum exposure of the screen to damage and hazard. With the platform 17 closed against the housing top member 13 and the screen closed against the platform, the unit assembly is compact as a secure protection for the associated chassis and its elements.

To facilitate the positioning and retention of devices to be tested on the platform 17, the upper face of said platform is preferably covered by a sheet 30 of appropriate material having a high coefficient of friction; sheet rubber and analogous materials, exediently ribbed or corrugated, being readily available and appropriate for such purpose.

At appropriate intervals determined by the characteristics of the associated chassis, the side and end walls of the housing are apertured, as at 31, to accommodate plug-in, or other, connections suitable to power the elements of the chassis, and other openings 32, normally covered by a swing plate 33, are provided to facilitate access by means of tools to adjustable elements of the chassis. Yet other openings 34 may expediently be provided through and in any desired relation with a wall of the housing for the attachment of brackets, or similar mountings, appropriate for the convenient support of elements under test, the holes 34 shown in Figure 1 being appropriately arranged for attachment of a bracket adapted to mount a flash gun under test in association with a camera carried by the platform 17.

As should be clear from the foregoing, the improved case functions in association with a synchrotester chassis housed therein to provide an altitudinally and angularly adjustable base for a unit to be tested and to facilitate positioning of said unit in opposition to a screen reactive to light emanations from the chassis, all in a manner facilitative of practical use in a variety of particular testing operations.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention—

1. A synchrotester case comprising a housing formed with an open bottom and one open end adapted to embracingly accommodate and marginally coact with the base and control panel of a synchrotester chassis including a lamp, a platform adapted to support one of the elements to be tested with a line of sight therethrough spacedly parallel to and longitudinally of its exposed upper surface hinged at one end to and overlying said housing for adjustment through a vertical arc toward and away from the housing, clamp means interrelating said platform and housing manipulable to secure the platform in any position convenient for observation along the sight line of the element supported thereby within its range of adjustment, an edge-illuminable, light-transmitting, diffusing screen hinged to said platform for adjustment through a vertical arc between juxtaposed parallelism with the platform exposed surface and perpendicularly-outstanding relation therewith across the sight line of the element supported thereby, and registered apertures in said housing and platform opposite the lower end position of the erected screen for transmission of light from the lamp to the screen and thence from the screen in the direction of the sight line.

2. A synchrotester case comprising a housing adapted to marginally coact with and enclose a chassis including a lamp formed with a flat top member and an end wall, a platform adapted to support one of the elements to be tested with a line of sight therethrough spacedly parallel to and longitudinally of its exposed upper surface hinged at one end to said top member at the upper margin of said end wall in overlying relation with and for adjustment of its free end through a vertical arc toward and away from the top member, clamp means interrelating said platform and housing manipulable to secure the platform in any position convenient for observation along the sight line of the element supported thereby within its range of adjustment, registered apertures in and elongated transversely of said top member and platform inwardly adjacent the hinged end of the latter for transmission of light from the chassis lamp, and an edge-illuminable, light-transmitting, diffusing screen hinged at its base to said platform for adjustment through a vertical arc about an axis paralleling the platform hinge axis between juxtaposed parallelism with the platform upper surface and perpendicularly-outstanding relation therewith and across the sight line of the element supported thereby in a disposition effective to oppose the lower end of the erected screen to said apertures for transmission of light from the chassis lamp to the screen and thence from the screen in the direction of the sight line.

3. A synchrotester case comprising a housing adapted to marginally coact with and enclose a chassis including a lamp, a platform adapted to support one of the elements to be tested with a line of sight therethrough spacedly parallel to and longitudinally of its exposed upper surface hinged at one end to an end of said housing in overlying relation with and for adjustment of its free end through a vertical arc toward and away from the housing, clamp means interrelating said platform and housing manipulable to secure the platform in any position convenient for observation along the sight line of the element supported thereby within its range of adjustment, registered apertures in and elongated transversely of said housing and platform inwardly adjacent the hinged end of the latter for transmission of light from the chassis lamp, and an edge-illuminable, light-transmitting, diffusing screen hinged at its base to said platform for adjustment through a vertical arc about an axis paralleling the platform hinge axis and aligned with the aperture margin remote from the platform hinge axis between juxtaposed parallelism with the platform upper surface and perpendicularly-outstanding relation therewith and across the sight line of the element supported thereby, whereby to oppose the lower end of the erected screen to said apertures for transmission of light from the chassis lamp to the screen and thence from the screen in the direction of the sight line.

4. A synchrotester case comprising a housing adapted to marginally coact with and enclose a chassis including a lamp, a platform adapted to support one of the elements to be tested with a line of sight therethrough spacedly parallel to and longitudinally of its exposed upper surface hinged at one end to an end of said housing in overlying relation with and for adjustment of its free end through a vertical arc toward and away from the housing, clamp means interrelating said platform and housing manipulable to secure the platform in any position convenient for observation along a sight line of the element supported thereby within its range of adjustment, registered apertures in and elongated transversely of said housing and platform inwardly adjacent the hinged end of the latter for transmission of light from the chassis lamp, a frame hinged at its base to said platform for adjustment through a vertical arc about an axis paralleling the platform hinge axis and aligned with the aperture margin remote from the platform hinge axis between juxtaposed parallelism with the platform upper surface and perpendicularly-outstanding relation therewith across the sight line of the element supported thereby, said frame being formed with an open base end adjacent and adapted to register at times with the aperture of the platform, and a screen of light-transmitting and light-diffusing material mounted in said frame to face an exposed surface thereof toward the adjustable end of the platform and to oppose its lower end to said apertures when the frame is erected for transmission of light from the chassis lamp to the screen and thence from the screen in the direction of the sight line.

5. A synchrotester case comprising a housing adapted to marginally coact with and enclose a chassis including a lamp, a platform adapted to support one of the elements to be tested with a line of sight therethrough spacedly parallel to and longitudinally of its exposed upper surface hinged at one end to an end of said housing in overlying relation with and for adjustment of its free end through a vertical arc toward and away from the housing, a clamp assembly interiorly and transversely of the housing, a manipulating knob at one end of said assembly exteriorly of the housing, links hingedly depending from said platform through the housing to slidable engagement with the clamp assembly, whereby to secure the platform in any position convenient for observation along the sight line of the element supported thereby within its range of adjustment, registered apertures in and elongated transversely of said housing and platform inwardly adjacent the hinged end of the latter for transmission of light from the chassis lamp, a frame hinged at its base to said platform for adjustment through a vertical arc about an axis paralleling the platform hinge axis and aligned with the aperture margin remote from the platform hinge axis between juxtaposed parallelism with the platform surface and perpendicularly-outstanding relation therewith across the sight line of the element supported thereby, said frame being formed with an open base end adjacent and adapted to register at times with the aperture of the platform, and a screen of light-transmitting and light-diffusing material mounted in said frame to face an exposed surface thereof toward the adjustable end of the platform and to oppose its lower end to said apertures when the frame is erected for transmission of light from the chassis lamp to the screen and thence from the screen in the direction of the sight line.

6. In a synchrotester case, a housing adapted for protective association with a synchrotester chassis including a lamp, a platform adapted to support one of the elements to be tested with a line of sight therethrough spacedly parallel to and longitudinally of its exposed upper surface hinged at one end to and overlying said housing, means manipulable to secure said platform in various positions convenient for observation along the sight line of the element supported thereby of angular adjustment relative to the housing, registered apertures for transmission of light from the chassis lamp in said housing and platform, and an edge-illuminable, light-transmitting, diffusing screen hinged to said platform to outstand perpendicularly therefrom across the sight line of the element supported thereby with its lower end opposed to said apertures for transmission of light from the chassis lamp to the screen and thence from the screen in the direction of the sight line and to close away from the platform hinge axis into juxtaposed parallelism with the platform.

7. In a synchrotester case, a housing adapted for protective association with a synchrotester chassis including a lamp, a platform adapted to support one of the elements to be tested with a line of sight therethrough spacedly parallel to and longitudinally of its exposed upper surface hinged at one end to and overlying said housing, means manipulable to secure said platform in various positions convenient for observation along the sight line of the element supported thereby of angular adjustment relative to the housing, registered apertures in said housing and platform for transmission of light from the chassis lamp, a frame hinged to said platform to outstand perpendicularly therefrom across the sight line of the element supported thereby with its lower end opposed to said apertures and to close away from the platform hinge axis into juxtaposed parallelism with the platform, an open lower end on said frame, and a screen of light-transmitting and light-diffusing material mounted in said frame to face an exposed surface thereof toward the adjustable end of the platform when the frame is erected and in such position to transmit light from the chassis lamp to the screen and thence from the screen in the direction of the sight line.

References Cited in the file of this patent

UNITED STATES PATENTS

| | | |
|---|---|---|
| 1,049,182 | Watkins | Dec. 31, 1912 |
| 1,739,837 | Hyman | Dec. 17, 1929 |
| 1,741,748 | White | Dec. 31, 1929 |
| 1,760,253 | Parrish | May 27, 1930 |
| 2,332,587 | Mendelsohn | Oct. 26, 1943 |